(12) United States Patent
Anstey et al.

(10) Patent No.: US 7,140,294 B1
(45) Date of Patent: Nov. 28, 2006

(54) ROUND BALER BALE EJECTING ARRANGEMENT

(75) Inventors: Henry Dennis Anstey, Ottumwa, IA (US); Daniel Eric Derscheid, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/400,435

(22) Filed: Apr. 7, 2006

(51) Int. Cl.
*B30B 5/04* (2006.01)

(52) U.S. Cl. ............................. 100/88; 100/87; 100/89; 56/341

(58) Field of Classification Search .................. 100/87, 100/88, 89, 100; 56/341
See application file for complete search history.

(56) References Cited

U.S. PATENT DOCUMENTS

| | | | |
|---|---|---|---|
| 4,433,619 A | 2/1984 | Anstey et al. ................. | 100/40 |
| 6,640,699 B1 | 11/2003 | Viaud ............................. | 100/7 |
| 2005/0235842 A1* | 10/2005 | Viaud et al. ................... | 100/87 |
| 2005/0241499 A1* | 11/2005 | Viaud et al. ................... | 100/89 |

* cited by examiner

*Primary Examiner*—Lowell A. Larson
*Assistant Examiner*—Jimmy Nguyen

(57) ABSTRACT

A large round baler includes a combined tensioning and ejecting arrangement comprising a tensioning arm assembly mounted to an upper front region of the baler sidewalls. The tensioning arm assembly operates such that, after formation of a bale in the baling chamber and the discharge gate has been swung to its raised discharge position, the tensioning arm assembly pivots into a region occupied by the completed bale so as to positively eject the bale. The combined tensioning and ejecting arrangement includes front and rear arm assemblies which define a compact assembly and share a pair of double-acting tensioning actuators and a single-acting ejection actuator. The tensioning arm assembly may be used with a baler having a light weight bale discharge gate or with a baler having a discharge gate formed in part by rear sections of sidewalls forming opposite sides of the baling chamber. In an alternate embodiment, the ejection actuator is replaced with a coil extension spring.

11 Claims, 6 Drawing Sheets

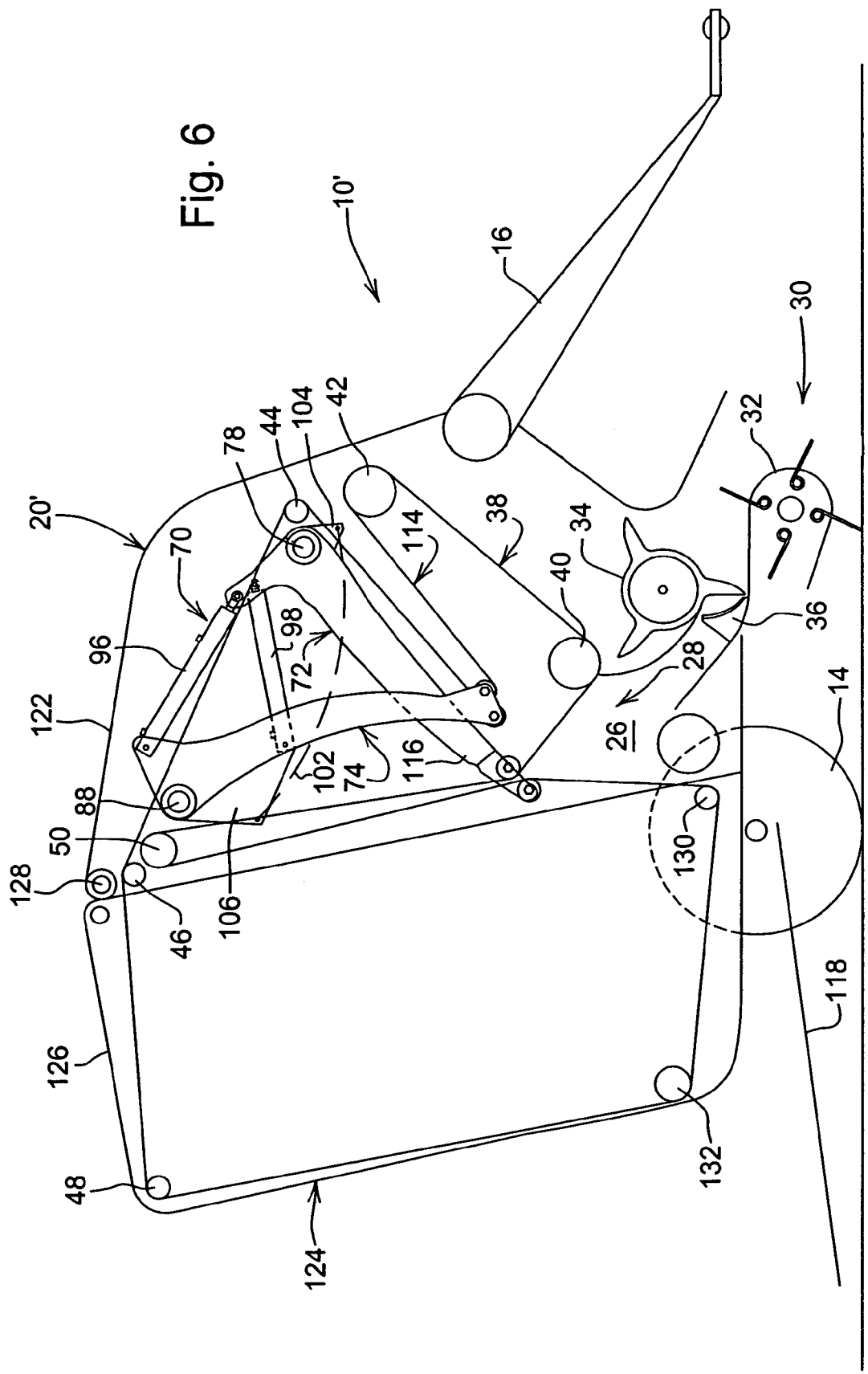

ROUND BALER BALE EJECTING ARRANGEMENT

FIELD OF THE INVENTION

The present invention relates to round balers, and more particularly, relates to ejecting a bale from a variable sized baling chamber.

BACKGROUND OF THE INVENTION

The bale-forming belts in known variable chamber balers are supported by a combination of fixed and movable belt support rolls, with some of the movable belt support rolls being carried by tensioning arms mounted for vertical pivotal movement, so as to control loops of excess lengths of bale-forming belts, at a start of a bale, with the tensioning arms being biased so as to yieldably resist movement in a direction permitting lengths of belting to be pulled out from the loops as the bale expands in size. The density of the formed bale depends upon the resistance to the belt expansion during formation of the bale. Once formation of the bale is completed, a discharge of the bale from the baling chamber is accomplished by opening a bale discharge gate which elevates a section of the bale-forming belts away from the lower rear portion of the bale so as to release it for discharge. U.S. Pat. No. 4,433,619 discloses a baler of this type. The baling process sometimes results in the formed bale becoming wedged between fixed sidewalls of the baling chamber. To overcome this problem, designers of some of these known balers have supported the bale-forming belts such that the belts tighten during the ejection process and help push the bale from the baling chamber. An example of a baler of this type is disclosed in U.S. Pat. No. 6,640,699.

Various embodiments of particularly useful tensioning arm arrangements are disclosed in U.S. patent application Ser. Nos. 11/109,079 and 11/109,585, which were each filed on Apr. 19, 2005. The tensioning arm arrangements of all of these embodiments are associated with a baler having a so-called light weight discharge gate comprising a triangular gate member having opposite triangular ends including respective first corners respectively pivotally mounted to opposite sidewalls of the baling chamber for pivoting about an axis located so as to be approximately at the central axis of a full sized bale formed in the baling chamber, with the triangular discharge gate member being located in a lowered position with rolls at front and rear corners guiding a lower run of the bale-forming belts during baling operation, and being swung to a raised discharge position permitting a formed bale to pass beneath the bale-forming belts and exit the baling chamber.

A drawback associated with the tensioning arm arrangement disclosed in U.S. Pat. No. 6,640,699 and with the tensioning arm arrangements disclosed in the above-identified patent applications is that bale ejection is not positive enough to consistently effect the discharge of a wedged bale. A further drawback associated with the tensioning arm arrangements disclosed in the above-identified patent applications is that the tensioning arm arrangements are not readily adaptable for being used with a baler that, instead of having a light weight discharge gate, has a baling chamber including a discharge gate comprising rear sidewall portions which carry baling belt support rolls and are pivotally mounted to upper rear corner regions of fixed front sections of the sidewalls for moving between a lowered baling position and a raised bale discharge position.

The problem to be solved with the present invention is that of providing a tensioning arm arrangement which provides positive bale ejection while being easily adaptable for use with balers having either a light weight discharge gate, or the more conventional discharge gate including pivotable baling chamber sidewall portions.

SUMMARY OF THE INVENTION

According to the present invention, there is provided a bale-forming belt tensioning arrangement which overcomes the above-noted drawbacks of the prior art.

An object of the invention is to provide a bale-forming belt tensioning arrangement including a tensioning arm assembly mounted for being selectively pivoted vertically through a zone occupied by a completed bale at a time that the bale is being discharged from the baling chamber, the tensioning arm acting to positively eject the bale.

The object is accomplished in a bale-forming belt tensioning arm arrangement including at least one tensioning arm assembly mounted for pivoting downwardly into, and upwardly from, an upper front region of a baling chamber provided for containing a bale being formed, the arm assembly having a lower end which engages the bale-forming belts in a region between two fixed bale-forming belt support rolls so as to create a loop of belt material, when no bale is present in the baling chamber, and which is forced upwardly by a forming bale while yieldably resisting transfer of a length of the bale-forming belts from the loop. The tensioning arm arrangement is designed so that its mounting is confined to a forward location of opposite sidewalls of the baling chamber, whereby it is easily adaptable for use with balers having either a light weight discharge gate, or a discharge gate including rear portions of the opposite sidewalls of the baling chamber.

This and other objects will become apparent from a reading of the ensuing description together with the appended drawings.

BRIEF DESCRIPTION OF THE DRAWINGS

FIG. 6 is view like FIG. 1, but showing an alternate embodiment wherein the baler includes a bale discharge defined by pivotally mounted rear sections of opposite sidewalls of the baling chamber

DESCRIPTION OF THE PREFERRED EMBODIMENT

Figure 1:
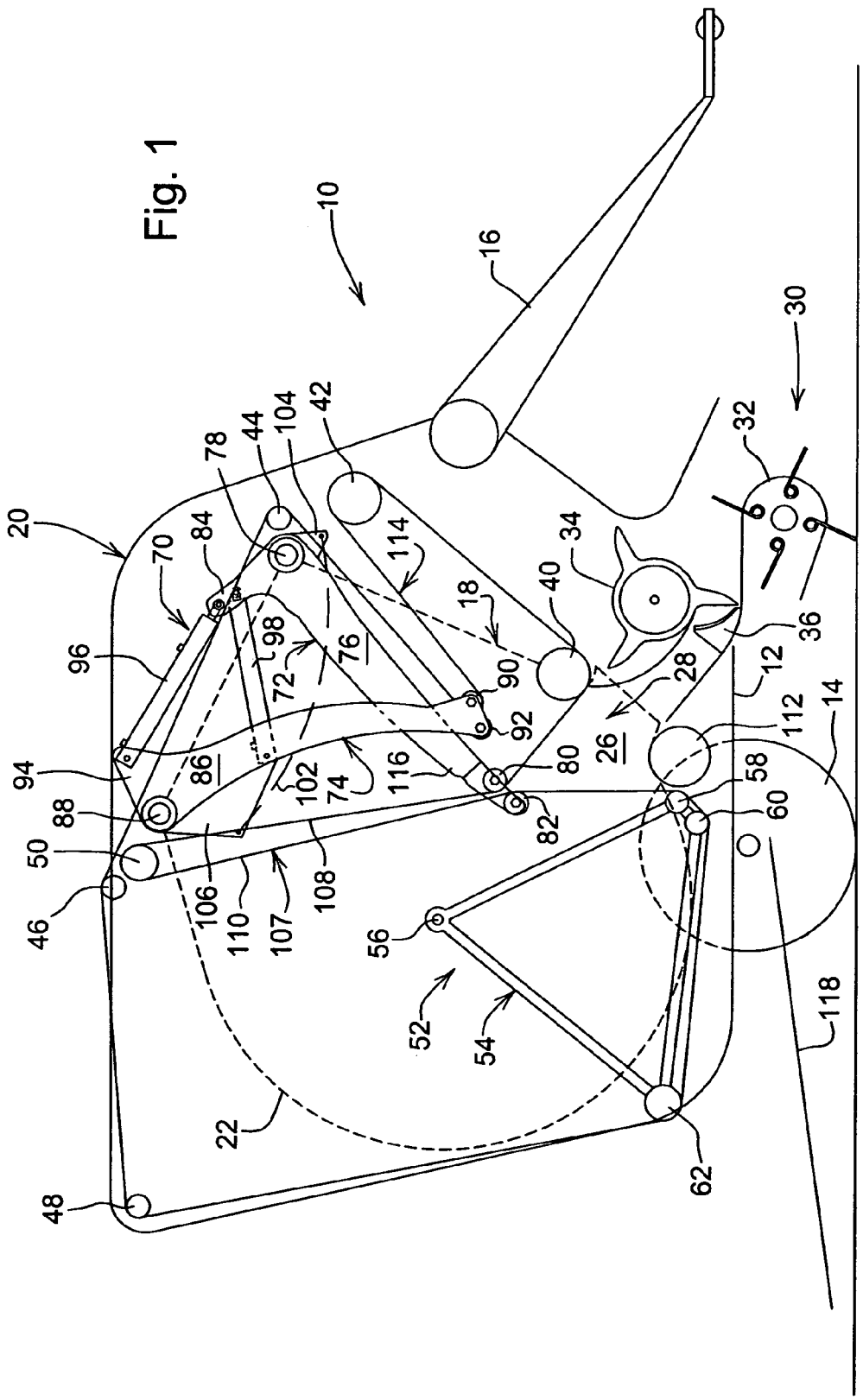
FIG. 1 is a schematic, right side view of a round baler of a type having a light weight discharge gate and equipped with a combined tensioning and ejecting arrangement constructed in accordance with the present invention and shown in a condition for starting a bale within the baling chamber.
Figure 2:
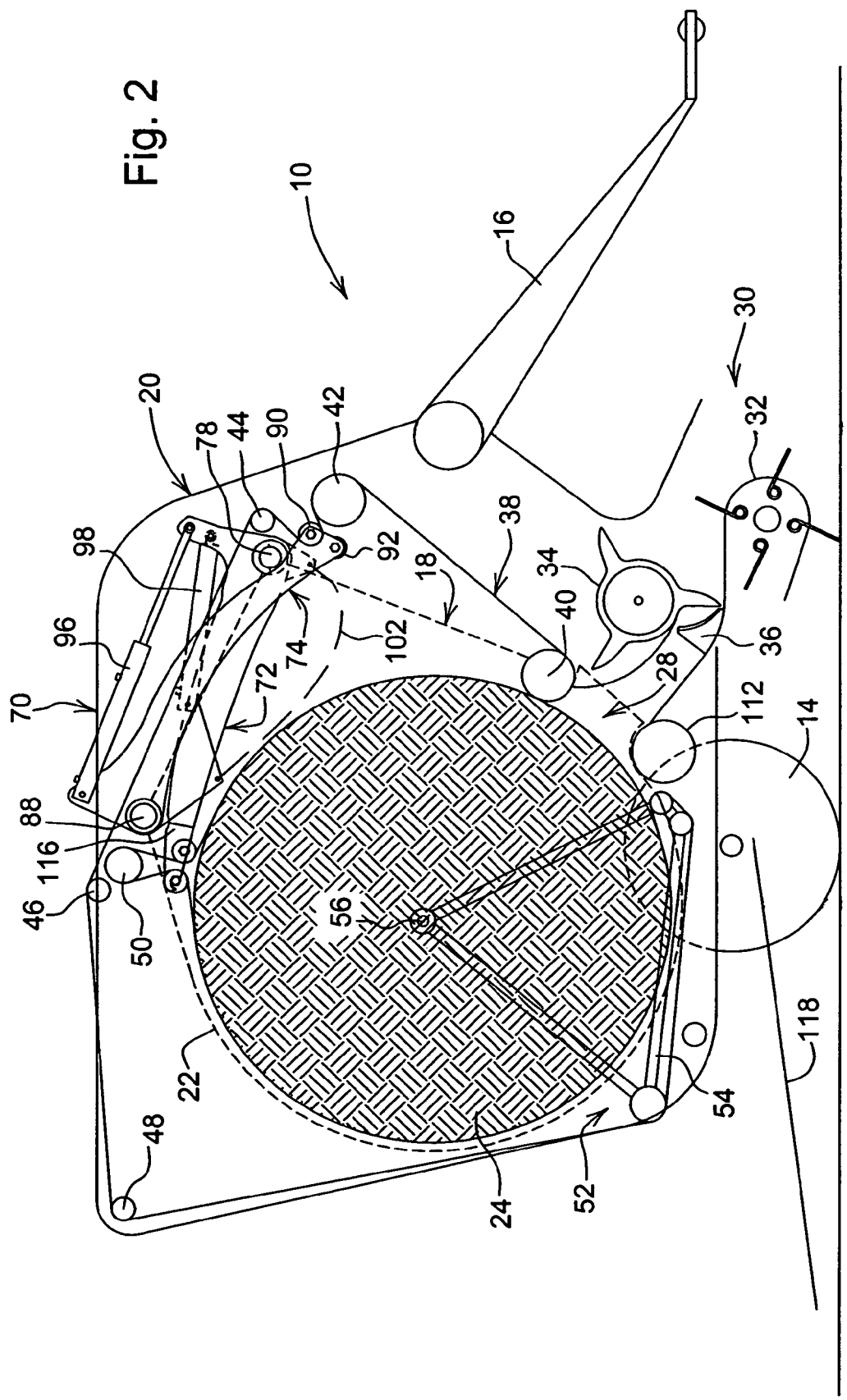
FIG. 2 is a view like that of FIG. 1, but showing a completed bale in the baling chamber.
Figure 3:
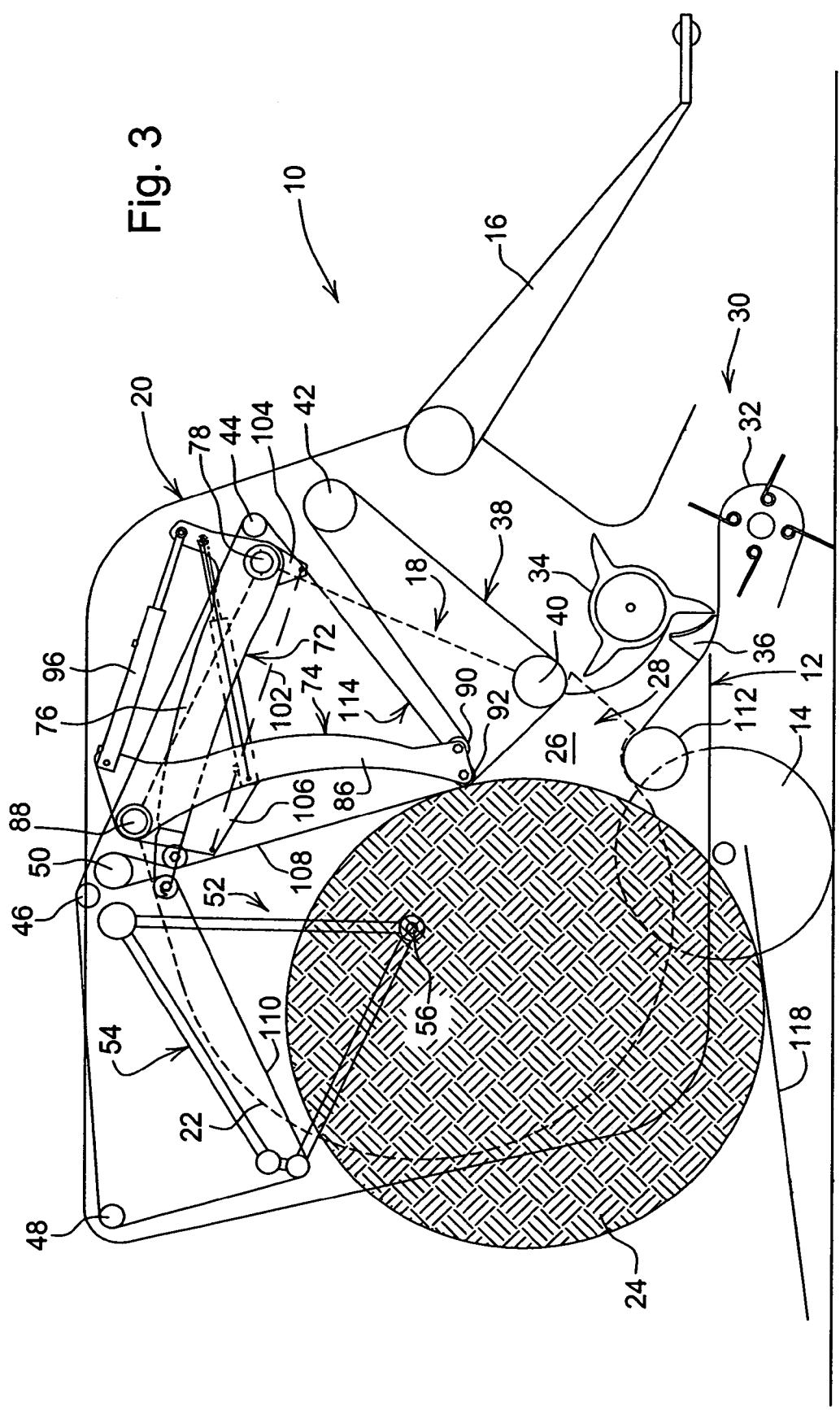
FIG. 3 is a view like that of FIG. 1, but showing the triangular light weight discharge gate in its raised bale discharge position, with the bale being discharged beneath it under the assistance of the combined tensioning and ejecting arrangement.

Referring now to FIGS. 1–3 of the drawings, there is shown a large round baler 10 including a chassis 12 carrying an axle on which ground wheels 14 are mounted so that the chassis 12 is supported for being towed over the ground by an agricultural tractor, not shown, coupled to a tongue 16 joined to, and projecting forwardly from the chassis 12. The chassis 12 includes a pair of transversely spaced sidewall structures including an inner pair of vertically oriented side walls 18, which are parallel to, and respectively spaced transversely from, a pair of outer sidewalls 20, with the inner walls 18, being shown only in dashed outline, for the sake of clarity. The inner sidewalls 18 have a rear region shaped so as to define a partial circular outer periphery 22 having a radius slightly larger than that of a full sized bale 24 (FIGS. 2 and 3) formed within an expansible baling chamber 26, described in more detail below, as crop is fed through an inlet 28 of the baling chamber by the action of a crop feeding arrangement 30 including a crop pick-up 32 and a feed rotor 34, which is here shown as working together with a knife arrangement 36 for cutting the crop into pieces before being baled.

Extending between and rotatably mounted at fixed peripheral locations of the outer sidewalls 20, which are beyond the peripheries of the inner pair of sidewalls 18, are a plurality of bale-forming belt support rolls, which provide support for a plurality of bale-forming belts 38 mounted in side-by-side relationship to each other across a width dimension of the rolls. Specifically, a bottom front roll 40 defines an upper border of the crop inlet 28 at a location just above a path traced by the tines of the crop feed rotor 34. Proceeding counterclockwise from the roll 40, there is provided a lower central front roll 42 spaced upwardly and forwardly from the roll 40, an upper central front roll 44 spaced a short distance above the roll 42, a top front roll 46 spaced upwardly and to the rear from the roll 44, and a top rear roll 48 spaced rearward from the roll 46. Located a slight distance below and forward of the top front roll 46 is a roll 50. The bale-forming belt support rolls 40–50, thus far described, constitute a set of fixed rolls, with further support for the belts 38 being afforded by a plurality of rolls mounted for movement, as is described in the immediately following paragraphs.

A light weight discharge gate 52 includes triangular end members 54 respectively located between the inner and outer sidewalls 18 and 20 at the opposite sides of the baler 10. As shown in FIG. 1, the light weight discharge gate 52 is positioned in a lowered baling position, wherein each of the triangular end members 54 includes an upper corner pivotally mounted, as at 56, to the adjacent spaced sidewalls 18 and 20, and about which the light weight discharge gate 52 may pivot vertically to a discharge position, shown in FIG. 3. The pivotal mountings 56 define a horizontal transverse pivot axis which is approximately coincident with that of the full sized bale 24 positioned within the baling chamber 26. The discharge gate 52 is dimensioned such that front and rear corners of each triangular end member 54 are located radially beyond the circular periphery 22 of the adjacent inner sidewall 18, with a pair of front and rear rolls 58 and 60 extending between, and being rotatably mounted to, front corner regions of the triangular end members 54, and with a roll 62 extending between, and being rotatably mounted to, rear corner regions of the triangular end members 54. The roll 60 is spaced down and to the rear from the roll 58.

Figure 4:
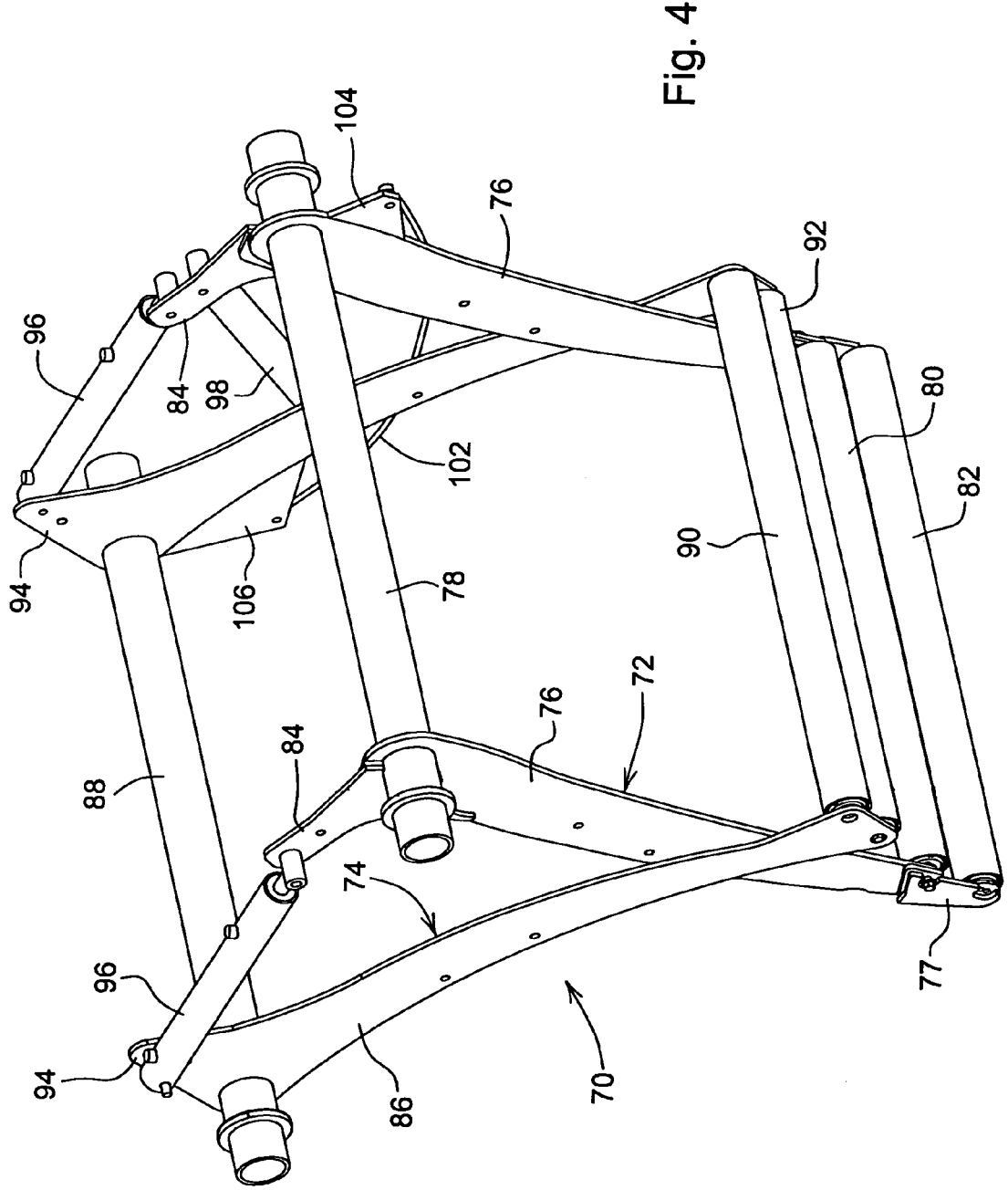
FIG. 4 is a right front perspective view of the combined bale tensioning and ejecting arrangement and showing a single-acting ejection actuator.

Referring now also to FIG. 4, it can be seen that a combined tensioning and ejecting arrangement 70 is mounted to an upper front region of the inner sidewalls 18. The arrangement 70 includes front and rear tensioning arm assemblies 72 and 74, respectively.

The front tensioning arm assembly 72 includes a pair of transversely spaced, parallel arms 76 having forward ends fixed to a support tube 78 extending between, and being mounted for rotation at, forward edges of the inner sidewalls 18 at a location spaced just to the rear of the bale-forming belt support roll 44. The arms 76 are located so that a major rear sections of the arms 76 sweep respective paths spaced a short distance inwardly of the sidewalls 18, with rear end sections 77 of the arms 76 being offset toward the sidewalls 18 so as to follow respective paths closely adjacent the sidewalls 18. Extending between, and mounted for rotation to, the rear end sections 77 of the arms 76 are front and rear belt guide rolls 80 and 82. Located at the forward ends of each of the arms 76, and disposed at approximately a right angle to a line extending through the centers of the tube 78 and rolls 80 and 82, is an actuator mounting ear 84.

The rear tensioning arm assembly 74 also includes a pair of transversely spaced, parallel arms 86, these arms having upper ends joined to a tube 88 extending transversely between, and being pivotally mounted to, upper edges of the inner sidewalls 18 at a location spaced a short distance down and forward of the fixed bale-forming belt support roll 50. The arms 86 are mounted so as to sweep a path closely adjacent the sidewalls 18 and closely adjacent the arms 76 when overlapped, as shown in FIG. 1. Extending between, and being mounted for rotation within, lower ends of the arms 86 are a front belt guide roll 90, and a rear belt-engaging roll 92, which reduces scuffing. Provided at the upper end of each of the arms 86 and disposed at approximately a right angle to a line extending through the center of the tube 86 and the belt guide roll 90 is an actuator mounting ear 94.

Control of the front and rear tensioning arm assemblies 72 and 74 is achieved by a pair of double-acting, extensible and retractable hydraulic tensioning actuators 96, respectively coupled between the mounting ears 84 and 94 at the opposite sides of the assemblies, by a single-acting, extensible and retractable hydraulic ejection actuator 98 coupled between the mounting ear 84 and a location of the right-hand arm 86 spaced from the support tube 88 so as to result in the ejection actuator 98 having a line of action effecting a direction of rotation of arm assembly 74 opposite to that effected by the tensioning actuators 96, and an elongate, flexible down stop 102, here shown as a cable 102, coupled between a mounting ear 104 provided on a forward region of the left arm 76 adjacent the support tube 78, and a mounting ear 106 provided on a bottom region of the left arm 86 adjacent the support tube 88. A spring or other device (not shown) may be provided for taking up the slack in the cable so that it does not interfere with operation of other parts of the baler 10.

Instead of the cylinder mounting ears 84 and 94 being formed integrally with the pairs of arms 76 and 84, and the down stop mounting ears 104 and 106 being respectively integral with the left arms 76 and 86, respective mounting ears (not shown) may be appropriately fixed to opposite end regions of each of the support tubes 78 and 88. Further, instead of a pair of tension actuators 96, a single actuator could be coupled between crank arms respectively provided at central locations between opposite ends of the support tubes 78 and 88. Also, in lieu of the direct connections between the actuators 96 and the arm assemblies 72 and 74, the actuators could be connected through means of levers mounted to the arm assemblies for pivoting freely in one direction and for engaging stop pins when pivoted in an opposite direction, with the levers having the actuators 96 coupled to them.

With reference to FIG. 1, it can be seen that a loop 107 of the baling belts 38 extends about the roll 50 and includes front and rear runs 108 and 110, respectively, that pass between the guide rolls 80 and 82 carried at the end of the front tensioning arm assembly 72. The front run 108 extends from the front guide roll 80 to a lower region of the lower front support roll 40, while the rear run 110 passes about front and lower regions respectively of the rolls 58 and 60 carried at the lower front corner region of the light weight discharge gate 52. It can be seen that a bale support roll 112 is located just forward of the roll 58 and defines a rear side of the crop inlet 28. When the baling chamber 26 is empty, as shown in FIG. 1, the front arm assembly 72 is positioned in its lowered position, wherein the guide rolls 80 and 82 effectively close the top of the baling chamber 26 so as to form a relatively small, wedge-shaped space, sized conducive for starting a bale. At this time, only a minimal length of the belts 38 is required for engaging the forming bale, with the excess length being contained in a loop 114 located between the central front rolls 42 and 44, and held by the guide roll 90 carried at the end of the rear arm assembly 74, which extends downwardly in overlapping relationship to the front arm assembly 72. The hydraulic actuators 96 are contracted at this time, and through the agency of a variable pressure relief valve (not shown) located for resisting the flow of fluid from the rod ends of the actuators 96, as is well known, yieldably resist the upward movement of the tensioning arm assemblies 72 and 74. As crop is fed into the baling chamber 26 by way of the baling chamber inlet 28, the belts runs 108 and 110, which respectively travel upward and downward, cause the crop to be rolled into a bale, with the size of the bale increasing, resulting in the front arm 72 pivoting clockwise and in the rear arm assembly 74 pivoting counterclockwise, with it being noted that at this time the ejection actuator 98 will be placed in a float condition permitting it to freely extend. When a full sized bale has been formed, as shown in FIG. 2, the entire loop 114 of the belts 38 will be substantially depleted, with the rear tensioning arm assembly 74 being in engagement with the support tube 78. At the same time, the front arm assembly 72 will have raised to the extent that the guide rolls 80 and 82 are near the fixed support roll 50, and to the extent that an arcuate stop surface 116 provided on the top edge of the arms 76 is close to engagement with the support tube 88. At this time, the actuators 96 will be substantially fully extended. Springs (not shown) could be used in addition to the actuators 96 for yieldably resisting upward movement of the arm assemblies 72 and 74.

Once a full sized bale 24 is formed in the baling chamber 26, the bale 24 may be discharged by effecting clockwise rotation of the light weight discharge gate 52 through the action of one or more hydraulic actuators (not shown) coupled between the sidewalls 18 and/or 20 and the discharge gate 52 so as to move the discharge gate 52 from its lowered baling position, shown in FIG. 1, to its raised discharge position, shown in FIG. 3. The completed bale 24 is then free to fall onto an unloading ramp 118 provided beneath the baling chamber. The actuators 96 are then placed in a float condition, and the single-acting ejection actuator 98 extended to cause the rear arm assembly 74 to pivot clockwise with the roll 92 engaging and rolling in a scuff free manner along the rear side of the front run of belts 108 of the loop 107 so as to bring the run 108 into contact with a central front region of the bale and exert a force urging the bale 24 out of the baling chamber 26, whereby the bale 24 is positively ejected. Therefore, any hesitation of the bale 24 to being discharged due to becoming wedged between the inner sidewalls 18 is avoided. At the time the arm assembly 74 is acting to eject the bale 24, it is also acting to remove any slack in the belts 38 which results when the bale 24 leaves the baling chamber, with it being noted that the loop 114 is once again formed containing a maximum length of the belts 38. However, during lowering the discharge gate 52 back to its baling or closed position, extra belt slack occurs and the down stop 102 then acts to prevent the rear arm assembly 74 from coming into contact with the front roll 80 of the front arm assembly 72.

It is desired that the operation of the single-acting ejection cylinder 98 occur automatically in sequence after the double-acting gate cylinders (not shown) have been actuated and the discharge gate 52 has been fully opened. This may be accomplished hydraulically by coupling the ejection actuator 98 in parallel with the gate cylinders, but through a restriction which assures that the gate cylinders will become fully extended before any fluid is directed to the ejection actuator 98. Of course, the timing function could be accomplished electro-hydraulically by providing an electric sensor which senses the position of the discharge gate and sends a signal to a solenoid valve for actuating the ejection actuator only after the discharge gate has been raised to its discharge position.

Figure 5:
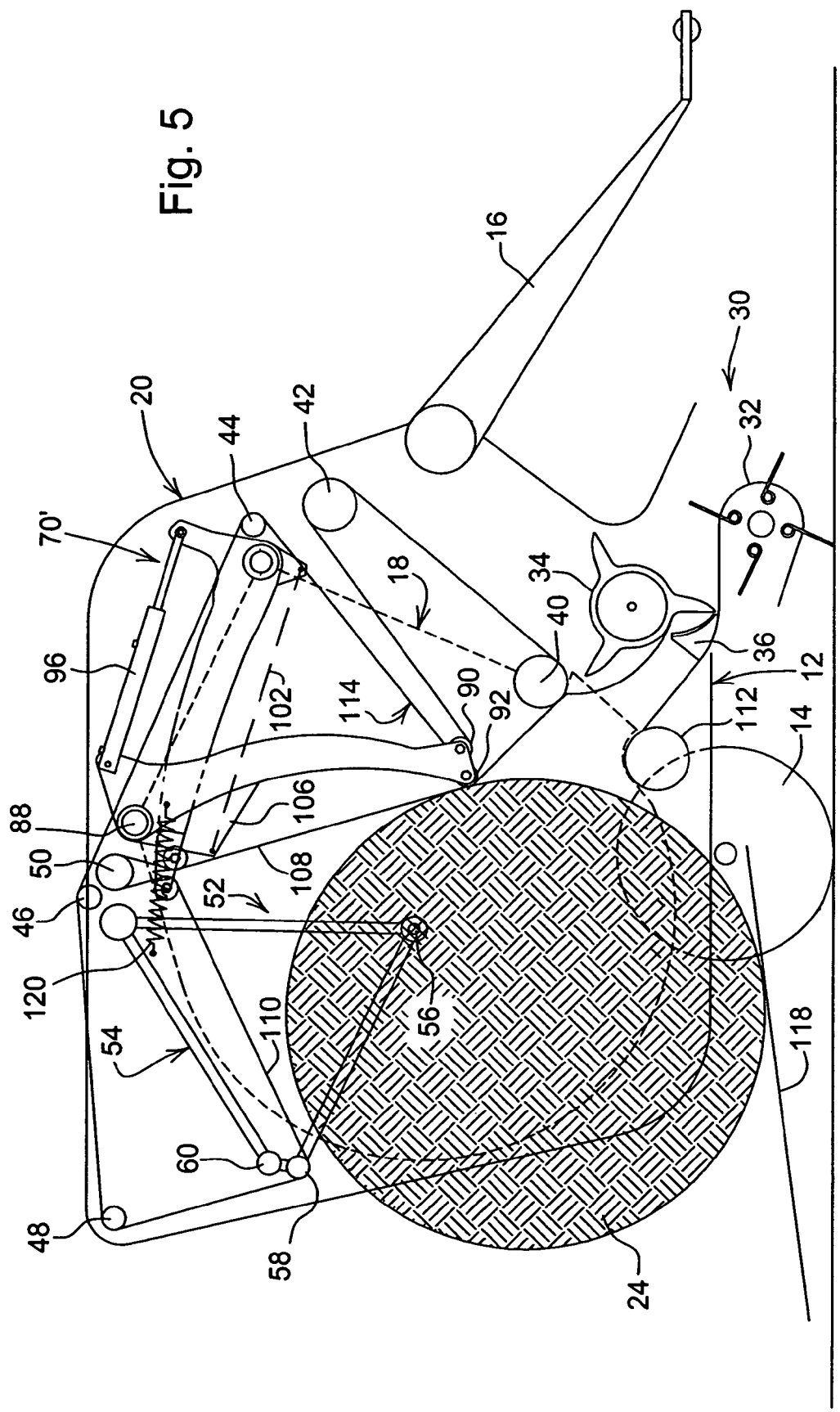
FIG. 5 is a view like that of FIG. 4 but showing a coil extension spring serving for applying an ejection force to the tensioning arm assembly.

Referring now to FIG. 5, there is shown a combined tensioning and ejection arrangement 70', which differs from the arrangement 70 shown in FIG. 3 only in that instead of the ejection actuator 98, a coil extension spring 120 is coupled between the sidewalls 18 and/or 20, and the rear tension arm assembly 74 for causing the rear tension arm assembly 74 to swing downwardly to eject a formed bale and to take up belt slack when the tensioning actuators 96 are placed in their float condition once the discharge gate 52 has reached its raised discharge position. It will be appreciated that during the baling operation, the spring 120 stores energy as the arms 86 are forced upwardly by the growing bale.

Referring now to FIG. 6, there is shown a baler 10' which differs from that disclosed in FIG. 1, only in that the baler 10' does not include inner sidewalls 18, nor the discharge gate 52, but rather includes opposite transversely spaced sidewalls 20'. The sidewalls 20' include respective front, fixed sections 122 forming part of a chassis 12'. A discharge gate 124, including a pair of sidewalls 126 defining movable sidewall sections of the sidewalls 20' is pivotally mounted, as at 128, to an upper rear corner regions of the fixed sidewall sections 122 for pivoting vertically between a lowered baling position, as shown, and a raised discharge position. In lieu of the movable rolls that are carried by the light weight discharge gate 52, a lower front gate roll 130 and a lower rear gate roll 132 are mounted to the discharge gate sidewalls 126. Thus, it will be appreciated that due to the compact nature of the combined tensioning and ejection arrangement 70, and its location in an upper front region of the baler, the arrangement 70 can be easily adapted for use either with the baler 10 or the baler 10'.

Having described the preferred embodiment, it will become apparent that various modifications can be made without departing from the scope of the invention as defined in the accompanying claims.

The invention claimed is:

1. In a large round baler including a baling chamber defined in part by a plurality of bale forming belts supported in side-by-side relationship across a plurality of fixed rolls supported by opposite sidewall structures, and by a plurality of movable rolls including rolls carried by a discharge gate pivotable between a lowered baling position and a raised discharge position, and at least one tensioning arm assembly mounted to said sidewall structures for pivoting vertically and carrying at least one bale-forming belt guide roller for engaging the bale-forming belts at a location between two adjacent ones of said plurality of fixed rolls, the improvement comprising: said at least one tensioning arm assembly being located for pivoting between a lowered position corresponding to a bale-starting condition, wherein said baling chamber is empty and said discharge gate is in its lowered baling position, and a raised position corresponding to a bale-completed condition, wherein said baling chamber contains a completed bale; at least one tensioning actuator being coupled to said at least one tensioning arm assembly for resisting movement of said at least tensioning arm assembly between its lowered and raised positions; and an ejector actuator being coupled to said at least one tensioning arm assembly for powering said arm assembly from said raised position to said lowered position once said discharge gate is raised to its discharge position, so that said at least one tensioning arm assembly acts to forcibly eject said completed bale; and a second tensioning arm assembly being mounted for pivoting counterclockwise about an axis located forward of said baling chamber when moving from a raised position, corresponding to when the completed bale is contained in the baling chamber, and a lowered position, corresponding to when said baling chamber is empty, and said tensioning actuator being coupled between said at least one tensioning arm assembly and said second tensioning arm assembly so as to resist movement of said at least one and second tensioning arm assemblies from their respective lowered positions to their respective raised positions as a forming bale enlarges said baling chamber, wherein said at least one and second tensioning arm assemblies each include a pair of arms, with the pair of arms of said at least one tensioning arm assembly straddling and crossing said arms of said second tensioning arm assembly when said arm assemblies are both in their respective lowered positions.

2. The large round baler, as defined in claim 1, wherein said discharge gate comprises a structure mounted for pivoting about a horizontal transverse axis which is approximately coincident with a central axis of said completed bale.

3. The large round baler, as defined in claim 1, wherein said sidewall structure comprises a front fixed section; and said discharge gate being formed in part by a rear movable section of said sidewall structure which is coupled to an upper rear region of said fixed sidewall section for pivoting between said baling and discharge positions.

4. The large round baler, as defined in claim 1, wherein said ejector actuator is a single-acting hydraulic actuator.

5. The large round baler, as defined in claim 1, wherein said ejector actuator is a spring coupled to said at least one tensioning arm assembly so that it stores energy when said at least one tensioning arm assembly moves from said lowered to said raised position, and which releases energy to drive said tensioning arm assembly back to said lowered position once said discharge gate is moved to its raised position.

6. The large round baler, as defined in claim 1, wherein said at least one tensioning arm assembly is mounted for pivoting clockwise about an axis located above said baling chamber when moving from said raised position to said lowered position; said plurality of fixed bale-forming belt support rolls including a third roll located above said baling chamber and having said bale-forming belts looped thereabout so as to define a front and rear runs of said bale-forming belts; the second tensioning arm assembly carrying second and third belt guide rolls spaced close to each other, with said front and rear runs of said bale-forming belts passing between, and cooperating with, said second and third belt guide rolls to form a top of said baling chamber when said chamber is empty.

7. The large round baler, as defined in claim 6, wherein said ejector actuator is coupled between said at least one and second arm assemblies.

8. The large round baler, as defined in claim 6, further comprises a down stop being located for preventing said guide roll carried by said at least one tensioning arm from colliding with said second tensioning arm assembly.

9. The large round baler, as defined in claim 8, wherein said down stop includes an elongate flexible member coupled between said at least one and second arm assemblies.

10. The large round baler, as defined in claim 9, wherein said flexible member is a cable.

11. The large round baler, as defined in claim 6, wherein said at least one and second tensioning arm assemblies respectively include first and second support tubes and a pair of transversely spaced, parallel arms being fixed to each of said first and second support tubes; and said first and second support tubes being mounted to said sidewall structures at first and second locations spaced such that, when said at least one tensioning arm assembly is in its raised position said pair of arms of said at least one tensioning arm assembly are at least closely adjacent said second support tube, and, when said second tensioning arm assembly is in its raised position, said pair of arms of said second tensioning arm assembly are at least closely adjacent said first support tube.

* * * * *